United States Patent
Boggs et al.

(10) Patent No.: US 8,117,424 B2
(45) Date of Patent: Feb. 14, 2012

(54) SYSTEMS, DEVICES, AND/OR METHODS FOR MANAGING PROGRAMMABLE LOGIC CONTROLLER PROCESSING

(75) Inventors: Mark Steven Boggs, Johnson City, TN (US); Alan D. McNutt, Johnson City, TN (US)

(73) Assignee: Siemens Industry, Inc., Alpharetta, GA (US)

(*) Notice: Subject to any disclaimer, the term of this patent is extended or adjusted under 35 U.S.C. 154(b) by 650 days.

(21) Appl. No.: 12/209,561

(22) Filed: Sep. 12, 2008

(65) Prior Publication Data
US 2009/0083522 A1 Mar. 26, 2009

Related U.S. Application Data

(60) Provisional application No. 60/994,728, filed on Sep. 21, 2007, provisional application No. 60/994,746, filed on Sep. 21, 2007.

(51) Int. Cl.
*G06F 15/76* (2006.01)
*G06F 9/305* (2006.01)

(52) U.S. Cl. .................. 712/41; 712/36; 712/223
(58) Field of Classification Search .......... 712/41, 712/223, 36
See application file for complete search history.

(56) References Cited

U.S. PATENT DOCUMENTS

| | | | |
|---|---|---|---|
| 5,068,821 A * | 11/1991 | Sexton et al. | 712/34 |
| 5,420,989 A | 5/1995 | Brightman | |
| 5,481,693 A * | 1/1996 | Blomgren et al. | 712/225 |
| 5,696,956 A * | 12/1997 | Razdan et al. | 712/23 |
| 6,018,797 A * | 1/2000 | Schmidt et al. | 712/42 |
| 7,005,856 B2 * | 2/2006 | Deak et al. | 324/418 |
| 7,200,838 B2 | 4/2007 | Kodosky | |

FOREIGN PATENT DOCUMENTS

| WO | WO93/01543 A | 1/1993 |
|---|---|---|
| WO | WO94/09416 A | 4/1994 |

OTHER PUBLICATIONS

Donandt J, "Improving response time of programmable logic controllers by use of a Boolean coprocessor", IEEE Comput Soc. PR, US, May 8, 1989.

* cited by examiner

*Primary Examiner* — Daniel Pan (57) ABSTRACT

Certain exemplary embodiments can provide a programmable logic controller, which can comprise a Reduced Instruction Set Computer (RISC) processor. The RISC processor can be adapted to, responsive to a received request to process a Boolean operation, execute a single processor data access instruction addressed to a region of a memory-mapped register corresponding to the Boolean operation.

17 Claims, 4 Drawing Sheets

Text representation of user logic
LOAD    I2
AND     I7
OR      I4
STORE   Q10

SYSTEMS, DEVICES, AND/OR METHODS FOR MANAGING PROGRAMMABLE LOGIC CONTROLLER PROCESSING

CROSS-REFERENCES TO RELATED APPLICATIONS

This application claims priority to, and incorporates by reference herein in its entirety, pending U.S. Provisional Patent Application Ser. No. 60/994,728, filed 21 Sep. 2007; and pending U.S. Provisional Patent Application Ser. No. 60/994,746, filed 21 Sep. 2007.

BACKGROUND

U.S. Pat. No. 6,018,797 (Schmidt), which is incorporated by reference herein in its entirety, allegedly discloses "[a]n integrated RISC and relay ladder logic processor uses shared registers, program counter, bus lines, and processing circuitry to eliminate delays associated with transfer of control in co-processor type architecture. The RISC instructions do not significantly interfere with the specialized hardware needed for rapid relay logic execution, the latter which may be further improved through the use of a pipeline well suited for relay ladder logic which creates few pipeline hazards. Two levels of condition codes are used for the arithmetic and logic instructions to permit nested arithmetic operations without interference with those instructions visible to the user. Hybrid instructions are provided to synchronize the relay ladder instructions with the arithmetic instructions, thus truly integrating the two instruction sets." See Abstract.

U.S. Pat. No. 7,200,838 (Kodosky), which is incorporated by reference herein in its entirety, allegedly discloses a "[s]ystem and method for programmatically generating a graphical program in response to state diagram information. The state diagram information specifies a plurality of states and state transitions. A graphical program generation program (GPG program), receives the state diagram information and automatically, i.e., programmatically, generates a graphical program (or graphical program portion) based on the state diagram information. The GPG program automatically includes graphical source code in a block diagram of the graphical program, which serves as a framework of the states specified by the state diagram information and the state transitions, with various 'placeholders' or 'containers' enabling the user to easily fill in the graphical program with source code specifying execution instructions for each state and Boolean conditions for each state transition. The specific graphical source code automatically generated depends on programming features supported by a particular graphical programming development environment with which the graphical program is associated." See Abstract.

SUMMARY

Certain exemplary embodiments can provide a programmable logic controller, which can comprise a Reduced Instruction Set Computer (RISC) processor. The RISC processor can be adapted to, responsive to a received request to process a Boolean operation, execute a single processor data access instruction addressed to a region of a memory-mapped register corresponding to the Boolean operation.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a programmable logic controller (PLC), which can comprise a Reduced Instruction Set Computer (RISC) processor. The RISC processor can be adapted to, responsive to a received request to process a Boolean operation, execute a single processor data access instruction addressed to a region of a memory-mapped register corresponding to the Boolean operation.

Figure 1:
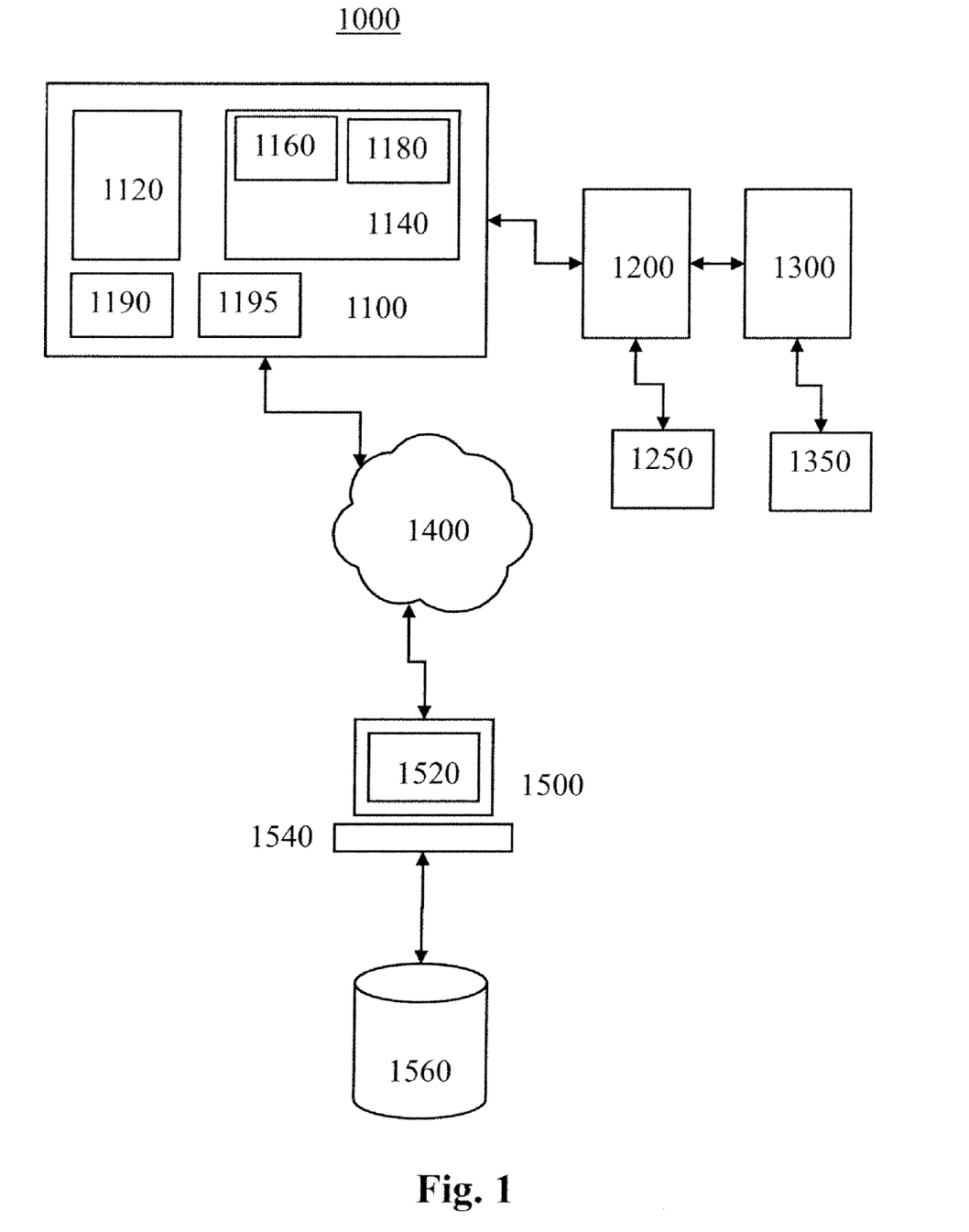
FIG. 1 is a block diagram of an exemplary embodiment of a system 1000.

FIG. 1 is a block diagram of an exemplary embodiment of a system 1000, which can comprise a programmable logic controller 1100. In certain exemplary embodiments, programmable logic controller 1100 can comprise a processor 1120, which can be, and/or can be comprised within, a RISC processor, an Application Specific Integrated Circuit (ASIC), and/or programmable logic controller 1100. Programmable logic controller 1100 can comprise and/or be communicatively coupled to any desired number of Input/Output modules, such as first Input/Output module 1200 and second Input/Output module 1300. First Input/Output module 1200 can be communicatively coupled to any desired number of sensors, such as sensor 1250. Second Input/Output module 1300 can be communicatively coupled to any desired number of actuators, such as actuator 1350.

In certain exemplary embodiments, processor 1120 can be adapted to, responsive to a received request to process a Boolean operation, execute a single processor data access instruction addressed to a region of a memory-mapped register 1140 corresponding to the Boolean operation. Processor 1120 can be adapted to select a location of a memory bit to use in a performed operation based on an address associated with the region of memory-mapped register 1140 corresponding to the Boolean operation.

Processor 1120 can be processor adapted to access the region of the memory-mapped register 1140 corresponding to the Boolean operation. The single processor data access instruction can be a normal data read processor instruction or a normal data write processor instruction. Fulfilling the single processor data access instruction might not require coprocessor interactions. The region of the memory-mapped register 1140 corresponding to the Boolean operation can comprise an Intermediate Result area 1160 and/or an Output Process Image area 1180.

Processor 1120 can be adapted to:
  store a result of the Boolean operation in a memory flag 1190; and/or
  store a result of the Boolean operation in a Result of Logic Operation memory flag 1195.

Programmable logic controller 1100 can be communicatively coupled to an information device 1500 via a network 1400. Information device 1500 can comprise and/or be communicatively coupled to a user interface 1520, a user program 1540, and a memory 1560. User program 1540 can be adapted to monitor and/or control one or more activities associated with programmable logic controller 1100 such as information transfers between programmable logic controller 1100 and/or first Input/Output module 1200 and/or second Input/Output module 1300. For example, user program 1540 can be adapted to create and/or edit a control program of programmable logic controller 1100. User interface 1520 can be adapted to render information regarding programmable logic controller 1100 such as information regarding the control program of programmable logic controller 1100 and/or information transfers between programmable logic controller 1100 and/or first input module 1200 and/or second input module 1300. Memory 1560 can be adapted to store and/or retrieve information regarding programmable logic controller 1100.

In ASIC implementations that include RISC processors whose instruction set does not include efficient bit manipulation instructions, the Boolean Helper Function can provide for relatively fast and/or code-efficient execution of Boolean logic operations in PLC applications.

Programs written by users of PLCs can comprise many Boolean operations on bit values that represent the state of, for example, input signals, state of output signals, and/or true/false storage locations, etc. Therefore, optimization of bit manipulation and Boolean operation performance can be important to designers of PLC products.

In certain exemplary embodiments, designers of PLCs can either select microprocessors that attempt to optimize a bit manipulation capability or design complicated coprocessor add-on logic to assist the main microprocessor with Boolean operation execution.

In certain exemplary embodiments, to enhance overall PLC system performance, high performance RISC processors can be integrated into an ASIC along with other peripheral units and memories. However, certain exemplary processors might not have efficient bit manipulation instructions, thereby penalizing the performance of Boolean operations.

Certain exemplary embodiments can provide a Boolean Helper Function that, when designed into an ASIC with a high-performance RISC processor, can result in completion of Boolean operations within a single processor instruction but can reduce cost and risk to an ASIC development effort.

To meet speed and code-efficiency desires and/or requirements, Boolean operations can complete within a single microprocessor instruction. For example, operations such as Boolean AND, OR, STORE, etc. (using operands from at least some memory areas) can be performed by the execution of a single processor instruction, such as a "store" instruction, which can avoid problems with instruction pipelines and/or interrupts. This "store" instruction can perform a memory-mapped access to a given register in the Helper to invoke a given Boolean operation (see exemplary Register Map below).

Certain exemplary Boolean operations can be performed by the execution of a single microprocessor data access instruction addressed to a region of the memory space allocated to the Helper. The actual address used for the memory access can select the operation performed and/or the location of the memory bit to use in the operation. Because this access can be accomplished by a normal data read or write microprocessor instruction, certain exemplary embodiments might not utilize and/or require coprocessor interactions.

Write access instructions generally can be preferred to read access instructions to avoid potential problems with microprocessor instruction pipelines and preemptive interrupts.

To achieve the single instruction Boolean operations, implementation of selected memory areas internal to the Helper can be utilized. These can include an Input Process Image (I) area, an Output Process Image (Q) area, and/or an Intermediate Result (N) area. The length of the input process image register (I) and the output process image register (Q) can be any desired size, such as 128 bits, 256 bits, 512 bits, 1024 bits, etc. The Input Process Image area can contain the state of physical input signals copied into the area by the PLC's firmware. The Output Process Image area can contain the results of logic decisions that can be copied out to the PLC's physical output signals by the PLC's firmware. The Intermediate Result area can be used to store intermediate logic results. The Intermediate Result area can be any size, such as for example, 8 bits, 16 bits, 32, bits, 64 bits, 128 bits, 256 bits, etc. Support for machine model specific registers can be provided.

A Result of Logic Operation (RLO) memory flag can be implemented to store the result value of many Boolean logic operations.

Within the Helper, the following Boolean operations can be implemented that use or affect the internal memory areas:

| Operation | Description |
| --- | --- |
| Load <bit> | Load value of the addressed bit into RLO. |
| Load Not <bit> | Load NOT'd value of the addressed bit into RLO. |
| AND <bit> | Perform Boolean AND operation between value of the addressed bit and the contents of RLO. Store result into RLO. |
| AND Not <bit> | Perform Boolean AND operation between NOT'd value of the addressed bit and the contents of RLO. Store result into RLO. |
| OR <bit> | Perform Boolean OR operation between value of the addressed bit and the contents of RLO. Store result into RLO |
| OR Not <bit> | Perform Boolean OR operation between NOT'd value of the addressed bit and the contents of RLO. Store result into RLO. |
| Exclusive OR <bit> | Perform Boolean XOR operation between value of the addressed bit and the contents of RLO. Store result into RLO. |
| Exclusive OR Not <bit> | Perform Boolean XOR operation between NOT'd value of the addressed bit and the contents of RLO. Store result into RLO. |
| Store <bit> | Write the value contained in RLO to the addressed bit. |
| Store Not <bit> | Write the NOT'd value of RLO to the addressed bit. |
| Conditional Reset <bit> | Writes 0 to the addressed bit if RLO = 1 |

-continued

| Operation | Description |
|---|---|
| Conditional Set <bit> | Writes 1 to the addressed bit if RLO = 1 |
| Unconditional Reset <bit> | Writes 0 to the addressed bit |
| Unconditional Set <bit> | Writes 1 to the addressed bit |

There can be a set of operations, as shown in the following table, that involve:
- manipulation of the RLO location; and/or
- Boolean operations using an externally supplied bit value. These can be utilized to support Boolean operations using data values from bit memory areas external to the Helper. These operations can utilize more than a single microprocessor instruction to complete, since the data value can be retrieved from the external memory and isolated before it is passed to Helper as an operand of one of the following operations.

| Operation | Description |
|---|---|
| Load <value> | Load value into RLO. |
| Load Not <value> | Load NOT'd value into RLO. |
| AND <value> | Perform Boolean AND operation between value and the contents of RLO. Store result into RLO. |
| AND Not <value> | Perform Boolean AND operation between NOT'd value and the contents of RLO. Store result into RLO. |
| OR <value> | Perform Boolean OR operation between value and the contents of RLO. Store result into RLO |
| OR Not <value> | Perform Boolean OR operation between NOT'd value and the contents of RLO. Store result into RLO. |
| Exclusive OR <value> | Perform Boolean XOR operation between value and the contents of RLO. Store result into RLO. |
| Exclusive OR Not <value> | Perform Boolean XOR operation between NOT'd value and the contents of RLO. Store result into RLO. |
| Not RLO | Toggle the value contained in RLO |
| Reset RLO | Reset RLO |
| Set RLO | Set RLO |

Each of the operations in the above table can have a single, unique address in the Helper's memory map that can be accessed by firmware (again, using a data write instruction) to perform the corresponding function.

In addition to the memory-mapped bit access of the internal memory areas, normal read and write access to these areas can be allowed (byte, word, and half word access). This can be helpful because the data in the Process Image areas can be copied in or out in an efficient manner when new physical input values are available or the physical outputs need to be updated.

Also, in a multi-threaded firmware environment, intermediate logic values and the RLO value might need to be saved and/or restored on a context switch from one thread to the next. These locations can be defined to be contiguous in the Helper's memory map to facilitate rapid save/restore during thread swap situations.

To help illustrate the Helper concept, assume an exemplary implementation in which the Boolean Helper's address space starts at address 0x10000 and the size of the internal memory areas (I, Q, and N) are 64 bits each. The following table shows a portion of the exemplary Helper's memory map and how each address maps to a particular Boolean operation and to a particular operand value in the internal memory areas:

| operation | address | description |
|---|---|---|
| Load <bit> | 0x10000 = I0 | Load addressed bit into RLO |
| | 0x10001 = I1 | For example, if a data access to address 0x10081 is performed, then the Helper shall copy the bit value from memory bit N1 into the RLO location. |
| | . | |
| | . | |
| | . | |
| | 0x1003F = I63 | |
| | 0x10040 = Q0 | |
| | 0x10041 = Q1 | |
| | . | |
| | . | |
| | . | |
| | 0x1007F = Q63 | |
| | 0x10080 = N0 | |

-continued

| operation | address | description |
|---|---|---|
| | 0x10081 = N1<br>.<br>.<br>.<br>0x100BF = N63 | |
| Load Not <bit> | 0x10100 = I0<br>0x10101 = I1<br>.<br>.<br>.<br>0x1013F = I63<br>0x10140 = Q0<br>0x10141 = Q1<br>.<br>.<br>.<br>0x1017F = Q63<br>0x10180 = N0<br>0x10181 = N1<br>.<br>.<br>.<br>0x101BF = N63 | Load NOT (inverse) of addressed bit into RLO<br>For example, if a data access to address 0x1013E is performed, then the Helper shall copy the inverse of the bit value from memory bit I62 into the RLO location. |
| AND <bit> | 0x10200 = I0<br>0x10201 = I1<br>.<br>.<br>.<br>0x1023F = I63<br>0x10240 = Q0<br>0x10241 = Q1<br>.<br>.<br>.<br>0x1027F = Q63<br>0x10280 = N0<br>0x10281 = N1<br>.<br>.<br>.<br>0x102BF = N63 | Perform Boolean AND operation between value of the addressed bit and the contents of RLO. Store result into RLO.<br>For example, if a data access to address 0x10242 is performed, then the Helper shall read the value stored in memory bit Q2 and perform a Boolean AND operation between that value and the value currently stored in the RLO location. The result of the AND operation is stored in the RLO location. |
| AND Not <bit> | 0x10300 = I0<br>.<br>.<br>. | Perform Boolean AND operation between NOT (inverse) of the addressed bit and the contents of RLO. Store result into RLO. |
| OR <bit> | 0x10400 = I0<br>.<br>.<br>. | Perform Boolean OR operation between value of the addressed bit and the contents of RLO. Store result into RLO. |
| OR Not <bit> | 0x10500 = I0<br>.<br>.<br>. | Perform Boolean OR operation between NOT (inverse) of the addressed bit and the contents of RLO. Store result into RLO. |
| XOR <bit> | 0x10600 = I0<br>.<br>.<br>. | Perform Boolean XOR operation between value of the addressed bit and the contents of RLO. Store result into RLO. |
| XOR Not <bit> | 0x10700 = I0<br>.<br>.<br>. | Perform Boolean XOR operation between NOT (inverse) of the addressed bit and the contents of RLO. Store result into RLO. |
| STORE <bit> | 0x10800 = I0<br>.<br>.<br>. | Write the value contained in RLO to the addressed bit. |
| STORE not <bit> | 0x10900 = I0<br>.<br>.<br>. | Write the NOT (inverse) of the value contained in RLO to the addressed bit. |

Figure 2:
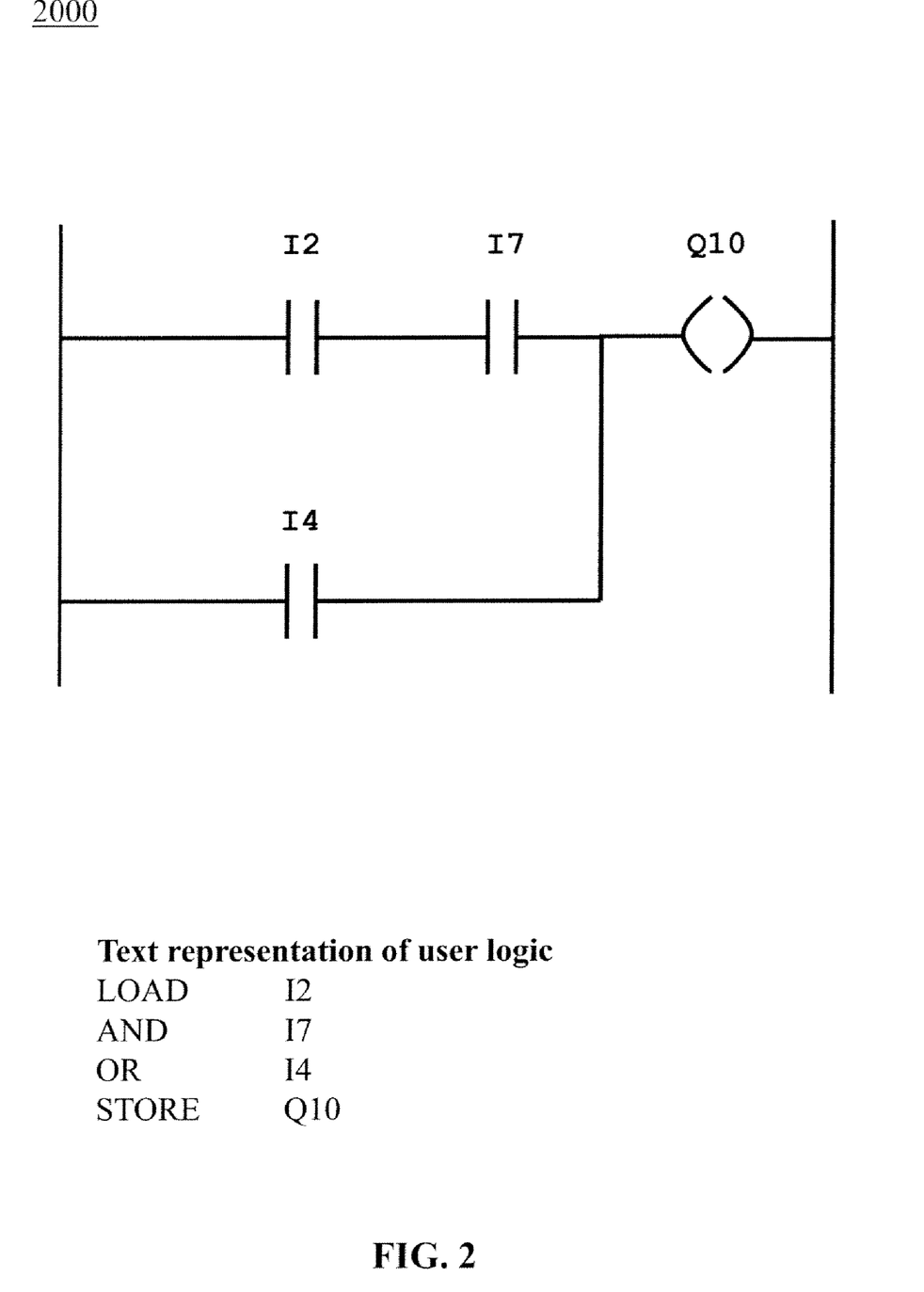
FIG. 2 is a schematic diagram of an exemplary embodiment of a ladder logic diagram 2000.

FIG. 2 is a schematic diagram of an exemplary embodiment of a ladder logic diagram 2000. In certain exemplary embodiments, the resultant microprocessor instruction sequence to perform the specified logic operations using the Helper for ladder logic diagram 2000 can be as follows:

| Assembly language code sequence to execute user logic using the Helper |
|---|
| LOAD_REGISTER R0,0x 10000 // Load Helper base address into R0 |
| STORE_BYTE_FROM_REGISTER R1,[R0,#0002] // Memory write to invoke LOAD I2 |
| STORE_BYTE_FROM_REGISTER R1,[R0,#0207] // Memory write to invoke AND I7 |
| STORE_BYTE_FROM_REGISTER R1,[R0,#0404] // Memory write to invoke OR I4 |
| STORE_BYTE_FROM_REGISTER R1,[R0,#084A] // Memory write to invoke STORE Q10 |
| (Each of the STORE_BYTE_FROM_REGISTER instructions can perform a data write to a destination address within the Helper memory. The destination address can be constructed from the immediate index value added to the base address located in R0. The value written in the instruction can be irrelevant - the destination address itself can determine the operation to perform and the operand used in the operation). |

Figure 3:
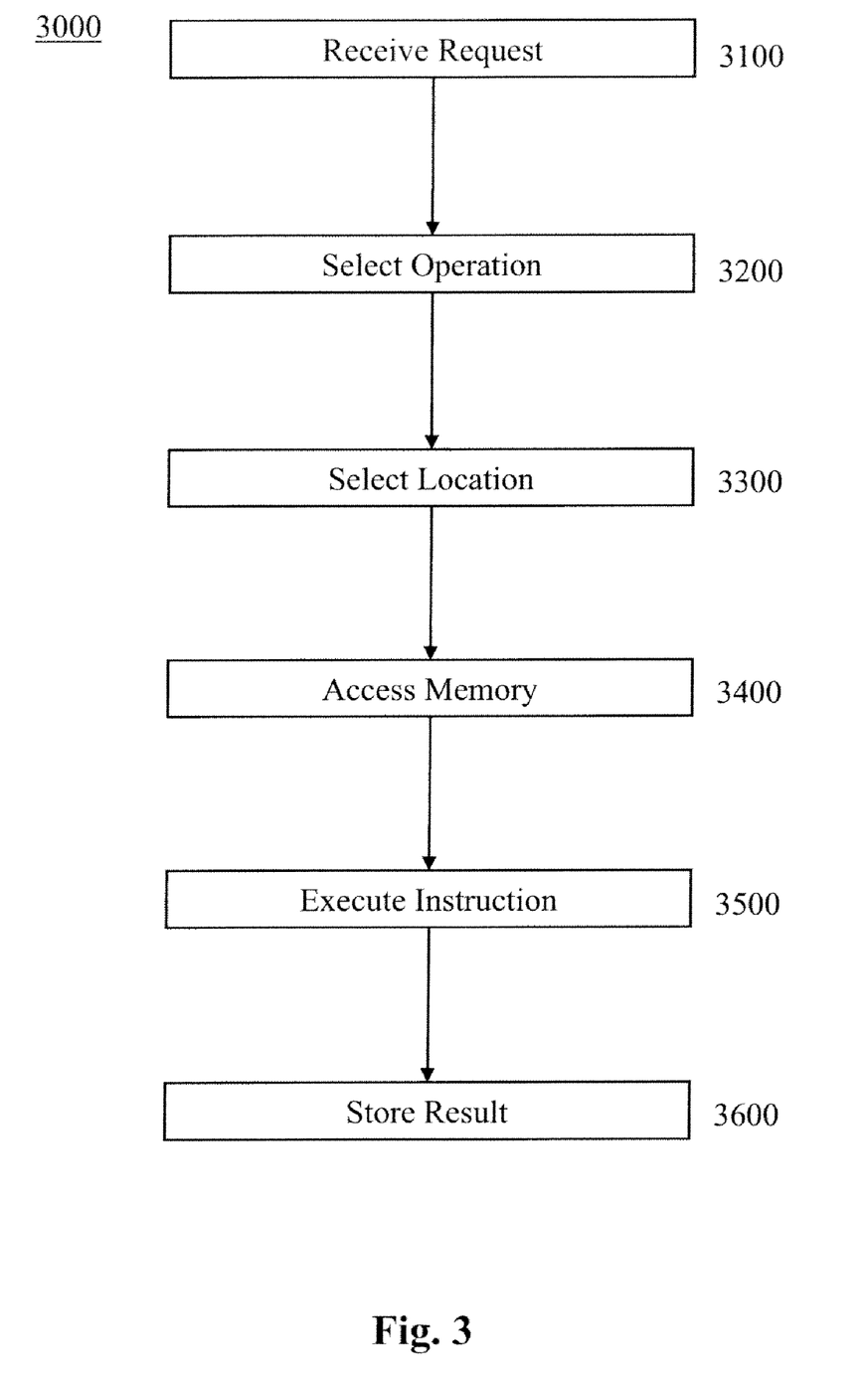
FIG. 3 is a flowchart of an exemplary embodiment of a method 3000.

FIG. 3 is a flowchart of an exemplary embodiment of a method 3000. In certain exemplary embodiments, one or more activities of method 3000 can be performed by machine-implementable instructions stored on a machine-readable medium. In certain exemplary embodiments, one or more of the activities of method 3000 can be implemented by and/or within a PLC. At activity 3100, a request to process a Boolean operation can be received. The request can be received by a processor of a PLC. In certain exemplary embodiments, the processor can be a RISC processor and/or can be embodied in an ASIC.

At activity 3200, a performed operation can be selected based on an address associated with the region of the memory-mapped register corresponding to the Boolean operation.

At activity 3300, a location of a memory register can be selected. In certain exemplary embodiments, a location of a memory bit to use in a performed operation can be selected based on an address associated with the region of the memory-mapped register corresponding to the Boolean operation. The region of the memory-mapped register can correspond to the Boolean operation comprises an Input Process Image area. The region of the memory-mapped register corresponding to the Boolean operation can comprise an Intermediate Result area. The region of the memory-mapped register corresponding to the Boolean operation can comprise an Output Process Image area.

At activity 3400, the memory register can be accessed. In certain exemplary embodiments, the region of the memory-mapped register corresponding to the Boolean operation can be accessed.

At activity 3500, a single processor data access instruction can be executed. The single processor data access instruction can be addressed to a region of a memory-mapped register corresponding to the Boolean operation. The single processor data access instruction can be a normal data read processor instruction. The single processor data access instruction can be a normal data write processor instruction. In certain exemplary embodiments, fulfilling and/or executing the single processor data access instruction might require no coprocessor interactions.

At activity 3600, a result of the executed instruction can be stored. In certain exemplary embodiments, a result of the Boolean operation can be stored in a memory flag. In certain exemplary embodiments, a result of the Boolean operation can be stored in a Result of Logic Operation memory flag.

Figure 4:
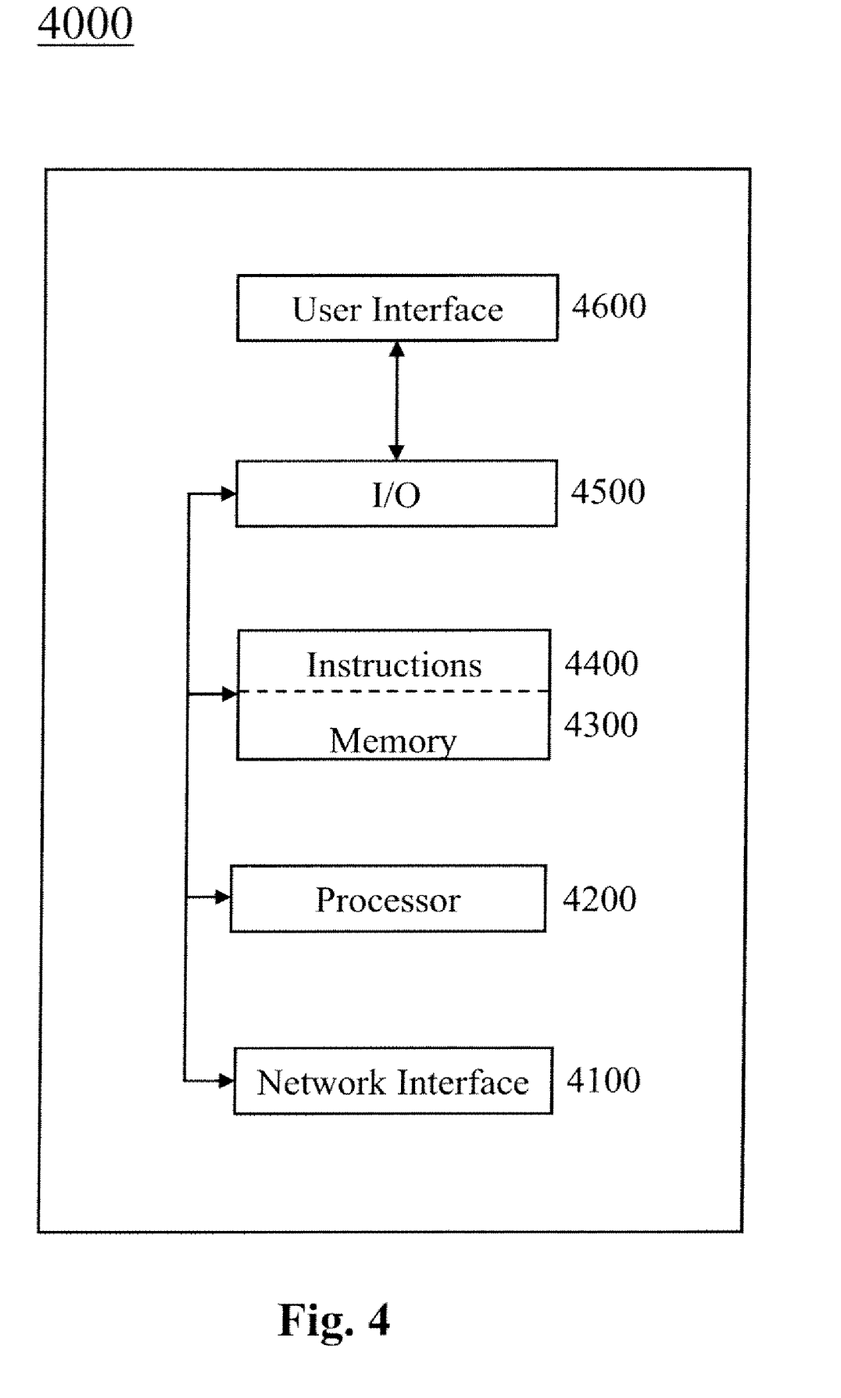
FIG. 4 is a block diagram of an exemplary embodiment of an information device 4000.

FIG. 4 is a block diagram of an exemplary embodiment of an information device 4000, which in certain operative embodiments can comprise, for example, information device 1500, of FIG. 1. Information device 4000 can comprise any of numerous circuits and/or components, such as for example, one or more network interfaces 4100, one or more processors 4200, one or more memories 4 300 containing instructions 4 400, one or more input/output (I/O) devices 4 500, and/or one or more user interfaces 4 600 coupled to I/O device 4 500, etc.

In certain exemplary embodiments, via one or more user interfaces 4600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

access—(n) a permission, liberty, right, mechanism, or ability to enter, approach, communicate with and/or through, make use of, and/or pass to and/or from a place, thing, and/or person; (v) to enter, approach, communicate with and/or through, make use of, and/or pass to and/or from.

activity—an action, act, deed, function, step, and/or process and/or a portion thereof.

adapted to—suitable, fit, and/or capable of performing a specified function.

address—(n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network.

apparatus—an appliance and/or device for a particular purpose.

Application Specific Integrated Circuit (ASIC)—an integrated circuit that is adapted to perform one or more specialized tasks.

area—a surface with determinable boundaries.
associate—to relate, bring together in a relationship, map, combine, join, and/or connect.
associated with—related to.
automatically—acting and/or operating in a manner essentially independent of external human influence and/or control. For example, an automatic light switch can turn on upon "seeing" a person in its view, without the person manually operating the light switch.
based—being derived from.
bit—a binary digit, having a value of either 0 or 1.
Boolean operation—one or more actions that produce a binary result.
can—is capable of, in at least some embodiments.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
comprised by—included by.
comprise—to include, but not be limited to, what follows.
configure—to design, arrange, set up, shape, and/or make suitable and/or fit for a specific purpose.
connect—physically or logically join, link, couple, and/or fasten two or more entities.
convert—to transform, adapt, and/or change, such as from a first form to a second form.
coprocessor—a computer processor used to supplement the functions of a primary central processing unit (CPU).
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
couple—to join, connect, and/or link.
create—to make, form, produce, generate, bring into being, and/or cause to exist.
data—information represented in a form suitable for processing by an information device.
define—to establish the meaning, relationship, outline, form, and/or structure of; and/or to precisely and/or distinctly describe and/or specify.
determine—to obtain, calculate, decide, deduce, establish, and/or ascertain.
device—an instrumentality adapted to a particular purpose.
execute—to carry out a computer program and/or one or more instructions.
fulfill—to carry out, effect, and/or complete.
generate—to create, produce, render, give rise to, and/or bring into existence.
haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.
hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.
image—an at least two-dimensional representation of an entity and/or phenomenon.
information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.
information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initialize—to create, produce, render, give rise to, and/or bring into existence.

input—a signal, data, and/or information provided to a processor, device, and/or system.

install—to connect and/or place in position and prepare for use.

interact—to act on each other.

interface—(n) a boundary across which two independent systems meet and act on and/or communicate with each other. (v) to connect with and/or interact with by way of an interface.

intermediate—between endpoints, yet not including an endpoint.

location—a place.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", I"macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

memory mapped register—a memory device adapted to be accessed according to a predetermined set of addresses.

method—a process, procedure, and/or collection of related activities for accomplishing something.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

no—lacking any.

normal—substantially perpendicular to a defined line and/or plane.

output—(n.) something produced and/or generated; data produced by an information device executing machine-readable instructions; and/or the energy, power, work, signal, and/or information produced by a system; (v.) to provide, produce, manufacture, and/or generate.

perform—to begin, take action, do, fulfill, accomplish, carry out, and/or complete, such as in accordance with one or more criterion.

plurality—the state of being plural and/or more than one.

predetermined—determine, decide, or establish in advance.

process—(n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control and/or optically-readable forms, etc.

project—to calculate, estimate, or predict.

provide—to furnish, supply, give, convey, send, and/or make available.

read—obtain from a memory device.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

Reduced Instruction Set Computer (RISC)—a microprocessor architecture that utilizes a relatively small set of relatively simple instructions that are adapted to be executed relatively quickly.

region—a continuous part of a device and/or system.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

require—to compel, demand, need, and/or request.

responsive—reacting to an influence and/or impetus.

result—an outcome and/or consequence of a particular action, operation, and/or course.

Result of Logic Operation memory flag—a logical indicator adapted to convey information regarding a completion of a Boolean function and/or procedure.

said—when used in a system or device claim, an article indicating a subsequent claim term that has been previously introduced.

select—to make and/or indicate a choice and/or selection from among alternatives.

set—a related plurality of predetermined elements; and/or one or more distinct items and/or entities having a specific common property or properties.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

single—existing alone or consisting of one entity.

soft deadline—the general case where completing an activity by a deadline results in a system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with an anti-lock braking system where a slow down in response would likely cause system failure, possibly even catastrophic failure.

store—to place, hold, retain, enter, and/or copy into and/or onto a machine-readable medium.

substantially—to a considerable, large, and/or great, but not necessarily whole and/or entire, extent and/or degree.

support—to bear the weight of, especially from below.

system—a collection of mechanisms, devices, machines, articles of manufacture, processes, data, and/or instructions, the collection designed to perform one or more specific functions.

transmit—to provide, furnish, supply, send as a signal, and/or to convey (e.g., force, energy, and/or information) from one place and/or thing to another.

use—to put into service.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

wherein—in regard to which; and; and/or in addition to.

within—inside.

write—a coding of data on a memory device.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
   a Reduced Instruction Set Computer (RISC) processor adapted to execute a single processor data access instruction in response to a received request to process a Boolean operation addressed to a region of a memory-mapped register of the RISC processor corresponding to said Boolean operation.

2. The system of claim 1, wherein:
   said processor is adapted to select a performed operation based on an address associated with said region of said memory-mapped register corresponding to said Boolean operation.

3. The system of claim 1, wherein:
said processor is adapted to select a location of a memory bit to use in a performed operation based on an address associated with said region of said memory-mapped register corresponding to said Boolean operation.

4. The system of claim 1, wherein:
said processor is adapted to access said region of said memory-mapped register corresponding to said Boolean operation.

5. The system of claim 1, wherein:
said single processor data access instruction is a normal data read processor instruction.

6. The system of claim 1, wherein:
said single processor data access instruction is a normal data write processor instruction.

7. The system of claim 1, wherein:
fulfilling said single processor data access instruction requires no coprocessor interactions.

8. The system of claim 1, wherein:
said region of said memory-mapped register corresponding to said Boolean operation comprises an Input Process Image area.

9. The system of claim 1, wherein:
said region of said memory-mapped register corresponding to said Boolean operation comprises an Intermediate Result area.

10. The system of claim 1, wherein:
said region of said memory-mapped register corresponding to said Boolean operation comprises an Output Process Image area.

11. The system of claim 1, wherein:
said processor is comprised within an Application Specific Integrated Circuit (ASIC).

12. The system of claim 1, wherein:
said processor is comprised within a programmable logic controller (PLC).

13. The system of claim 1, wherein:
said processor is adapted to store a result of said Boolean operation in a memory flag.

14. The system of claim 1, wherein:
said processor is adapted to store a result of said Boolean operation in a Result of Logic Operation memory flag.

15. A method comprising:
at a programmable logic controller, receiving a request to process a Boolean operation addressed to a region of a memory-mapped register of the programmable logic controller corresponding to the Boolean operation, and in response to the received request, executing a single processor data access instruction.

16. A machine-readable medium comprising machine-implementable instructions for activities comprising:
receiving a request to process a Boolean operation addressed to a region of a memory-mapped register corresponding to said Boolean operation, and in response to the received request, executing a single processor data access instruction.

17. A system comprising:
an Application Specific Integrated Circuit (ASIC) comprising a Reduced Instruction Set Computer (RISC) processor adapted to, execute a single processor data access instruction in response to a received request to process a Boolean operation addressed to a region of a memory-mapped register of said RISC processor corresponding to said Boolean operation, said processor comprised by a programmable logic controller.

* * * * *